United States Patent

Weatherby

[15] 3,648,810
[45] Mar. 14, 1972

[54] HELICAL SPRING CLUTCH
[72] Inventor: John H. Weatherby, Sewell, N.J.
[73] Assignee: Warner Electric Brake & Clutch Company, South Beloit, Ill.
[22] Filed: June 15, 1970
[21] Appl. No.: 46,127

[52] U.S. Cl. .................. 192/26, 192/33 C, 192/81 C, 192/36
[51] Int. Cl. ......................................... F16d 11/06
[58] Field of Search ............ 192/26, 33 C, 12 BA, 81 C, 192/36

[56] References Cited

UNITED STATES PATENTS 2,984,325   5/1961   Tomko et al. .................. 192/81

Primary Examiner—Mark M. Newman
Assistant Examiner—Randall Heald
Attorney—Wolfe, Hubbard, Leydig, Voit & Osann

[57] ABSTRACT

A helical clutch spring is attached at one end to an input hub and its other end to a control collar and surrounds, but is normally out of engagement with, input and output hubs. A friction member is wrapped around the collar, normally rotates with the collar, and has a shoulder which when intercepted and stopped will cause the friction member to slip and produce a drag on the collar. The drag on the collar, in turn, causes the spring to wrap down and drive the output with the input.

1 Claims, 4 Drawing Figures

PATENTED MAR 14 1972  3,648,810

INVENTOR:
JOHN H. WEATHERBY
BY Howson & Howson
ATTYS

HELICAL SPRING CLUTCH

The present invention relates to a helical spring clutch and more specifically to one which is normally out of engagement, but which is engaged by the drag imposed upon its collar to cause the spring to wrap down. The drag is imposed by a friction member carried by the collar which friction member when stopped by interception of its shoulder allows the collar to slip.

The technique of disconnect by means of a solenoid as an actuator is well known in the clutch art. The solenoid has many advantages because of its positive action. However, for many applications the cost of the solenoid is so high relative to the cost of the clutch that the additional cost cannot be justified. In such applications where other motor means are necessary according to the present invention, it is possible to make the output hub freewheeling in both directions and to engage the clutch when the drive means is energized to drive the input hub. This is accomplished by use of a friction drag means having a rotatable stop engaged and stopped by a nonrotating stop means in its path. The drag means is carried by the collar relative to which it can slip once it engages the nonrotating stop means but moving with the collar and input hub to which it is attached by the clutch spring prior to engagement with the nonrotating stop means.

More specifically, the present invention relates to a clutch employing a helical clutch spring which is attached to and rotates with an input hub. The spring surrounds and is normally out of contact with a cylindrical output hub and, at the end opposite that which is attached to the input hub, it is attached to a collar. A drag means is provided on the collar which normally rotates with the collar but which has stop means which, when intercepted by a nonrotatable stop means in its path of rotation, imposes a drag on the collar member causing the clutch spring to engage and drive the output hub.

For a better understanding of the present invention reference is made to the accompanying drawings in which FIG. 1 shows in cross section a preferred embodiment of the clutch of the present invention;

Figure 1:
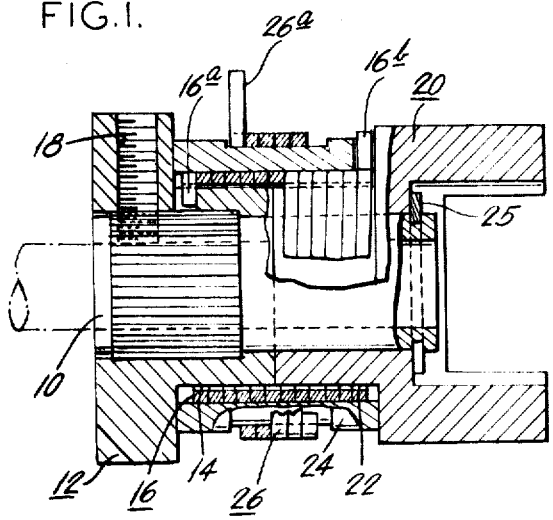

Referring to FIG. 1, the input structure includes a tube 10 on which is press fitted input hub 12 and which receives the input shaft, not shown. Input hub 12 includes a portion having a cylindrical clutch surface 14 which is surrounded by a helical clutch spring 16, which in this case is a left-hand wound spring having a tang 16a engaged in a slot in the input hub so that rotation of the hub 12 drives the spring 16 with it. The hub 12 preferably provides a cylindrical input hub surface 14 down onto which the spring can wrap but it always provides at least means for attachment of one end of the spring. The input hub is provided with at least one tapped hole 18 which receives a set screw to engage and hold the input shaft when it is introduced through the tube 10. The helical spring 16 surrounds, but is normally out of engagement with, cylindrical clutch surface 22 of output hub 20. The opposite end of the clutch spring from that attached to the input hub by tang 16a is provided with a tang 16b which is engaged in a slot in the end of tubular collar 24. The collar 24 need not in all cases be tubular but such construction is of advantage for reasons which will appear and because the inner surface of tubular collar 24 acts as a limiting stop to the outward expansion of spring 16, limiting its maximum outer diameter. Collar 24 normally rotates with input hub 12 as a consequence of being connected thereto by spring 16. However, when a slight drag is imposed upon it, the collar will tend to lag behind the driven input and cause the spring 16 to wrap down on the clutch surface 22 output hub, thus causing the output hub 20 to be driven with the input hub 12. Assuming that the input hub 12 is driven clockwise, as viewed from the left-hand end, the left-hand clutch spring will wrap down tightly on the two hubs as the input hub turns with the drag being imposed upon the collar 24. In this particular embodiment, drag is imposed upon the collar by another helical spring 26, which is wrapped around and tightly engages the outer surface of the collar 24. Spring 26 is provided with a tang 26a, which may be intercepted by a pawl, or other stop, movable into the path of the tang in the course of rotation. Should tang 26a be stopped by stop means movable into its path the left-hand spring 16 will tend to unwind, but will still impose a drag upon the collar 20 causing the wrap-down of spring 16 on clutch surfaces 14 and 22. When this happens output hub 20 drives the output (not shown) through suitable clutch coupling.

It will be observed that the clutch construction is quite simple, with both the input hub 12 and the output hub 20 being composed of stepped diameter construction, wherein beyond its active clutch surface the diameter of the hub increases to provide a shoulder which contains the collar 24 and spring 16. It will be seen that the collar and spring assembly can be first attached to the input hub and then the output hub slid into place and held by a snap ring 25 fitting into a groove in tube 10. Output hub 18 rides on the tube 10 as a bearing.

Figure 2:
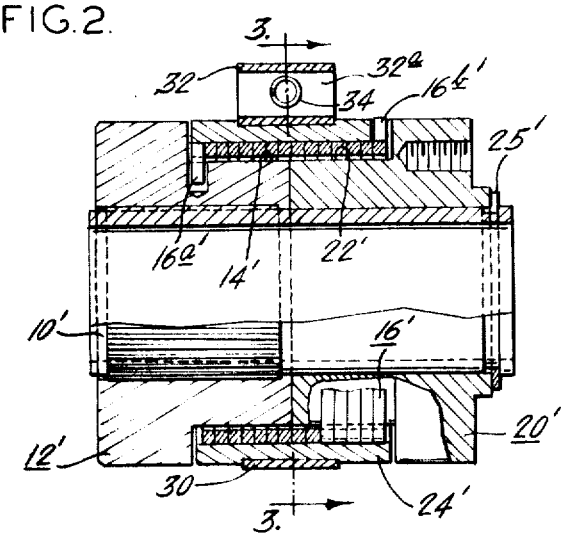
FIG. 2 shows in said cross section a modified version of the invention for heavier applications.
Figure 3:
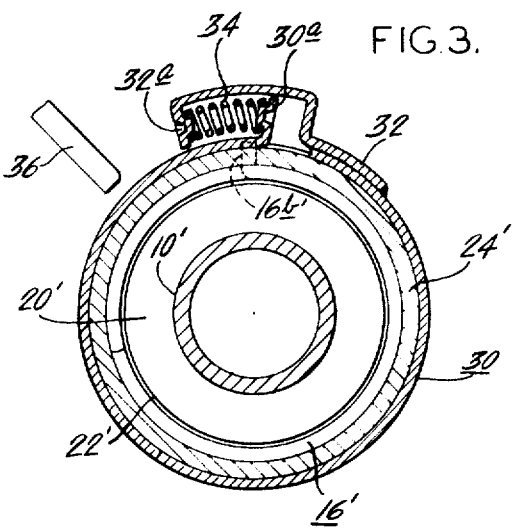
FIG. 3 is a sectional view taken along line 3—3 of FIG. 2.

Referring to FIGS. 2 and 3, it will be seen that the clutch structure is essentially the same, and accordingly corresponding number designators have been given to similar parts with the addition of primes thereto. The clutch is intended to be a heavy duty clutch and it will be appreciated that the spring drag member 26, and particularly its stop tang 26a are relatively light in construction and subject to applications with limited loads. In the version of FIGS. 2 and 3, the friction member circumferentially engaging the collar and normally rotating with the collar is a metal band, or strap, 30. As best seen in FIG. 3 one end of the strap 30 is turned radially outward to provide a radial spring base shoulder 30a. A strip bracket 32 is welded to strip 30, although in another application the bracket function could be performed and made out of the same strip 30. The bracket is bent radially outwardly beyond the end of spring base shoulder 30a and bypasses that spring base shoulder, thereafter being turned radially inwardly to provide a radial spring base shoulder 32a. A helical compression spring is partially compressed and inserted between these two spring base shoulders, preferably over bosses provided on the spring bases to help retain the spring in place. It will be understood that the spring 34 urges the spring base shoulders apart and therefore the friction band 30 into tighter engagement with the collar 24'. If the shoulder 32a, constituting a rotatable stop, is moved into fixed stop 36, the friction drag member will stop and the spring 34 will further compress as the band 30 tends to continue to rotate with the collar 24', thus effectively loosening the collar and permitting slip while at the same time imposing drag. The nonrotatable stop 36 may be permanently in the path of the rotatable stop 32a and supported from a motor housing, for example. This is possible because the input hub 14, the collar 24' and the band 30 will not rotate unless the motor is energized and when the motor is energized the connection of input to output is desired and accomplished through the clutch.

Figure 4:
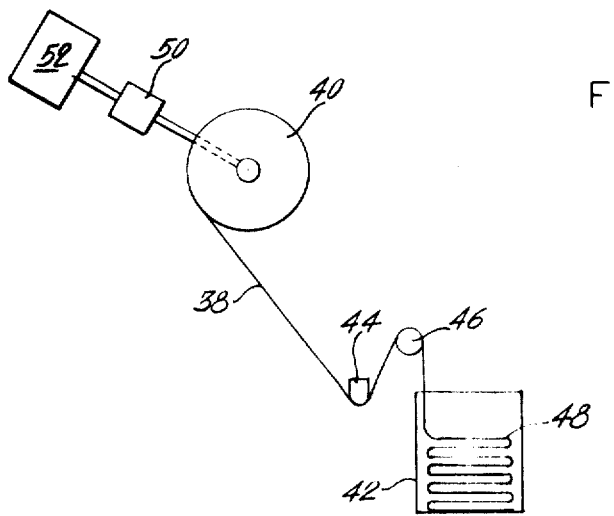
FIG. 4 is a schematic diagram showing a magnetic tape transport in rewind mechanism of which the clutch of the present invention may be used.

In understanding the invention an application for the clutch of the present invention, FIG. 4 may be of considerable help. FIG. 4 shows schematically one type of *magnetic tape deck*, such as used in computers. A magnetic tape 38 is stored on a supply reel 40 and fed into a storage bin 42. Intermediate the supply reel and storage bin is a head 44, which may record on and/or read information from the magnetic tape. A conventional drive capstan 46 drives the tape in one selected direction of movement and allows it to fall freely into the bin 42 and accumulate there in conventional manner. Since the capstan is doing the driving it is desirable that the reel 40 be freewheeling in order to permit the movement dictated by the capstan. Thus the clutch 50 is normally disengaged and the only time it is desirable to engage the clutch is when motor 52 is energized to rewind the tape. The motor casing supports nonrotatable stop 36 which intercepts the rotatable stop, such as 26a or 32a, when rewinding is started, and causes the clutch to engage. At all other times the clutch is disengaged so that the inertia of the motor and other parts of the system are not added to that of the reel.

In the application described a nonrotatable fixed position stop which remains in position has been described. The use of such a fixed stop presumes sufficient compliance in the drive system to permit the clutch spring to drive the drive system in reverse as the spring unwinds in order to release the clutch from the output hub, or presumes some other means permitting such release. In a system where such compliance does not exist means for removing the nonrotatable stop means from the path of the friction drag stop means may be provided at the expense of somewhat complicating the system. Also removable nonrotatable stop means may be desirable for other reasons and the possibility is intended to be within the scope of the invention.

The present invention has been described in terms of two embodiments. It will be clear to those skilled in the art that many other variations and embodiments of the invention are possible. All such modifications, variations and embodiments within the scope of the claims are intended to be within the scope and spirit of the present invention.

I claim:

1. A clutch structure having an input hub, a helical clutch spring attached at one end to the input hub, an output hub adjacent the input hub and having a cylindrical clutch surface engageable by, but normally out of engagement with, the helical clutch spring, a collar attached to the end of the clutch spring remote from the end attached to the input hub, a friction drag means circumferentially engaging the collar and normally rotating with the collar and the input hub, having rotatable stop means engageable by nonrotatable stop means in the path of the rotatable stop means, whereby the friction drag means is prevented from rotating with the collar and provides a drag on the collar, which, in turn, causes the collar to move relative to the input hub to cause the spring to engage the output hub, whereby the output hub is driven, said friction drag means comprising a band snugly fitting over a cylindrical surface of the collar and having outwardly directed shoulder portions at each end of the band, one end of said band being extended from its shoulder portion by an extension passing over the other shoulder and terminating in a radially inwardly directed shoulder, and spring means extends between said radially inwardly directed shoulder and the shoulder on the other end of the band, said spring tending to urge said shoulders apart and tightening the band, whereby the effect of stopping said inwardly directed shoulder is to oppose the spring and loosen the band by compressing the spring permitting slippage of the band relative to the collar but simultaneously providing a drag to the collar.

* * * * *